INVENTOR
EIICHI GOTO

BY Wenderoth, Lind & Ponack
Attys.

INVENTOR
EIICHI GOTO

BY Wenderoth, Lind & Ponack
Att'ys.

INVENTOR
EIICHI GOTO
BY Wenderoth, Lind & Ponack
Attys.

INVENTOR
EIICHI GOTO
BY Wenderoth, Lind & Ponack
Attys.

United States Patent Office 2,948,819

Patented Aug. 9, 1960

2,948,819

DEVICE COMPRISING PARAMETRICALLY EXCITED RESONATORS

Eiichi Goto, Nakameguro, Meguro-ku, Tokyo, Japan, assignor to Kokusai Denshin Denwa Co., Ltd., Tokyo, Japan, a company of Japan Filed Feb. 27, 1956, Ser. No. 568,121

Claims priority, application Japan Mar. 12, 1955

6 Claims. (Cl. 307—88)

This invention relates to an electric device comprising parametrically excited resonators, i.e. resonators in which the excitation causes oscillations in accordance with the variation of a parameter in a non-linear differential equation, and more particularly to a circuit in which the said resonators or groups of the said resonators are connected in cascade in stages and the said resonators are successively excited, and the occurrence of a back-coupling voltage between the resonators of each stage can be avoided.

Hereinafter, a parametrically excited resonator will be referred to as "parametron."

Generally when a non-linear resonance circuit formed by parametrons is excited by an exciting wave having twice the frequency of the resonance frequency of the circuit, and the resonance frequency output is taken out of the said circuit, the phase of the output wave is limited to one of two phases which are different by $\pi$ radians. Assuming that the above two phases of the said output wave are zero-phase and $\pi$-phase respectively, whether the resonance frequency output of the non-linear resonance circuit shall have zero-phase or $\pi$-phase is determined by the phase of the phase control wave which is separately applied to the said resonance circuit. The said phase control wave has substantially the same frequency as the resonance frequency of the resonance circuit, and may have a small intensity.

The above characteristics of a parametron make it possible to apply it to circuit elements for use in electric computers, electrical communication devices etc., the details of which have been described in my application for patent filed on May 16, 1955, Serial Number 508,668.

When the parametrons are used as circuit elements connected in cascade in stages for forming circuits, such as those of electric computers and electrical communication devices, use is frequently made of a circuit in which the above elements are successively excited following the stages of cascade connection and elements of each stage are coupled so that the resonance frequency output thereof is used as a phase control input to the elements of the succeeding stage. In such a case, it frequently happens that the output voltage of certain excited elements couples with other excited elements in preceding stages through the elements in intermediate stages which are not excited, and the operation of the circuit is made uncertain due to the above mentioned undesirable coupling among the elements. The above undesirable voltage will be referred to herein as back-coupling voltage.

The object of the present invention is to provide a circuit in which successively excited parametrons are connected in cascade, and the oscillation output of excited parametrons is used as a phase control wave thereof for the succeeding parametrons to be excited and the back-coupling voltage among parametrons of each stage is eliminated.

The accompanying drawings illustrate the principles of this invention wherein.

It must be understood that the drawings are given for the purpose of exemplification without limiting the invention or the claims thereto.

Figures 1A, 1B, 2A:
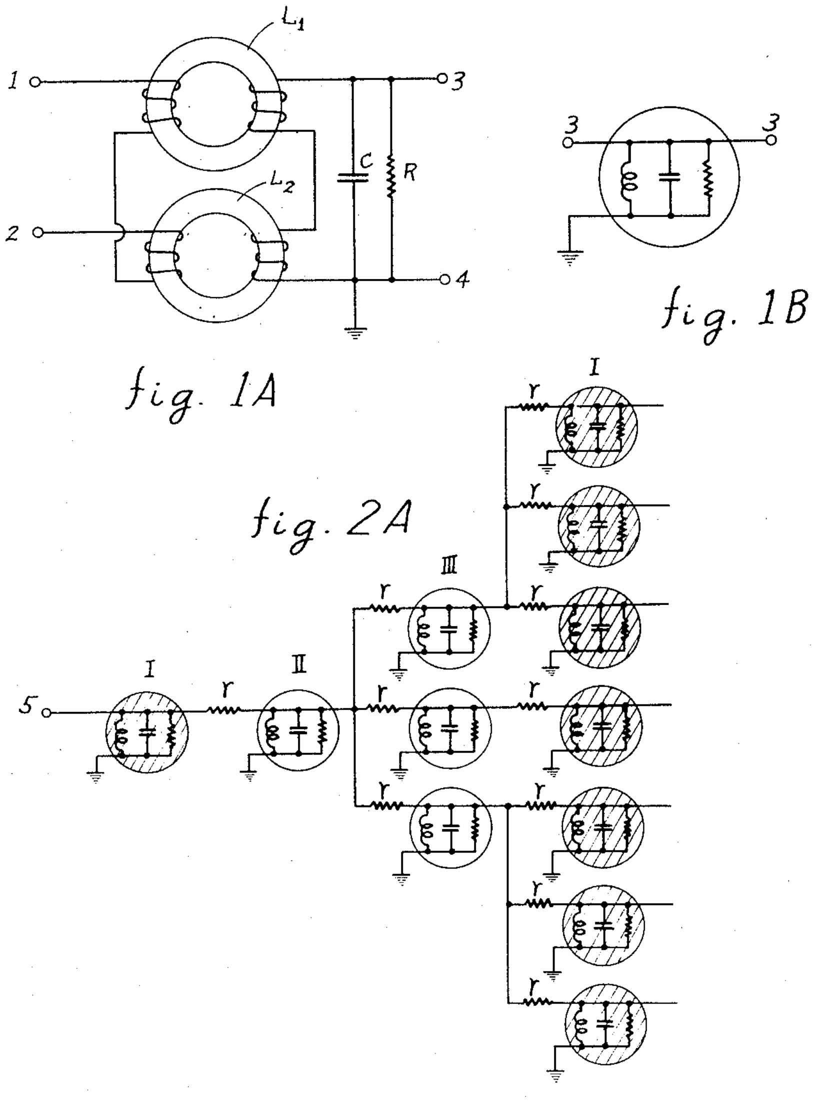
Fig. 1A shows an example of the circuit of a parametrically excited resonator, namely a parametron.
Fig. 1B shows a symbol of such a circuit as used in the drawings.
Fig. 2A shows an example of the circuit in which parametrons are connected in cascade.

Referring to the drawings, the primary and secondary windings on the magnetic cores $L_1$ and $L_2$ of Fig. 1A are separately connected in series, and the primary winding or the secondary winding on the core $L_2$ is wound in the opposite direction to that wound on the core $L_1$ whereby the exciting wave which is applied to the terminals 1 and 2 is cancelled and does not appear at the two terminals 3 and 4 of the secondary windings. A condenser C is connected between the terminals 3 and 4 whereby a resonant circuit is formed, and R is connected in parallel to the secondary windings as a damping resistance. In the devices in which the phase of the oscillation output wave of the parametron is controlled by the phase of the phase control wave, the exciting coil, namely the primary winding, is not so important for the purpose of explaining the function of a parametron. Therefore, in the explanation given hereunder, a parametron is represented as in Fig. 1B wherein the primary windings are omitted.

Figure 2B:
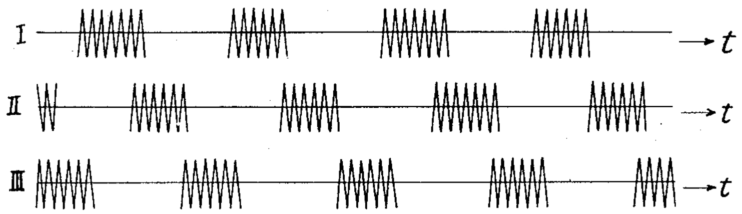
Fig. 2B shows the wave form of the exciting wave which successively excites parametrons of Fig. 2A.

In Fig. 2, parametrons belonging to group I are excited by the exciting wave I shown in Fig. 2B, those belonging to group II by the exciting wave II, and those belonging to group III by the exciting wave III, respectively. That is, the parametrons of each group (group I, II and III in Figs. 2A, 3, 4, 5, 6 and 8) are successively so excited as to overlap slightly in relation to time $t$ as shown in Fig. 2B. Therefore, if a zero-phase control wave is applied to the input terminal 5 at a certain period of time, and if the elements belonging to group I (shown by shading) are excited, one element at the left end oscillates at zero phase. This zero phase output is applied to an element of group II through the coupling impedance $r$, and therefore, when the group II is excited, the oscillation output thereof also becomes zero-phase. Similarly, when the group III is excited, the elements of group III oscillate at zero-phase. When the group I is again excited, the elements produce an oscillation wave at zero-phase. Such is the operation of the parametrically excited resonator circuit of Fig. 2A. However, the elements of group II receive at the right end, as a control input, the output of the elements of group I (in Fig. 2A, shown as seven parametrons), through the circuit of the elements of group III, besides receiving as a control input at the left end, the output of the element of group I. Where parametrons are connected in cascade, an undesirable back-coupling voltage is applied from the output elements through the elements not excited, this voltage being in addition to the proper coupling following the order of the stages of the cascade connection, and thereby the circuit operation is made uncertain. For instance, when the output elements are branched as in Fig. 2A, and the elements of group I at the left end oscillate at zero-phase and all the elements of group I at the right end oscillate at $\pi$-phase, it occurs that the element of group II may be controlled by the input of the back-coupling voltage from the elements of group I at the right end, an undesirable $\pi$-phase oscillation being produced thereby.

Figure 3:
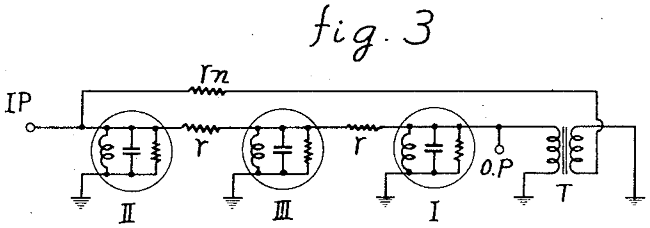
Figs. 3, 4, 5 and 6 show embodiments of the circuit of this invention.

In Fig. 3, the elements I, II and III which are successively excited are coupled by the coupling impedance $r$ as shown in the drawing, and transfer successively the zero-phase or $\pi$-phase signal applied to the input terminal IP. The output of the element I is applied to the transformer T and the phase-reversed output is fed back to the input terminal of the element II through the neutralising impedance $r_n$. Supposing that the output voltage of the element I is E, the transformation ratio of the transformer T is 1/1, and each element is used exactly at the resonance frequency, the voltage $e_n$ fed back to the input terminal IP through the neutralising impedance $r_n$ (the value of the impedance being assumed as $r_n$) is represented as:

$$e_n = -E\frac{R}{R+r_n}$$

where R is given as the damping resistance of the parametrically excited resonator. Also, assuming that the voltage induced by the standard coupling intensity in each element is KE, and $$K=\frac{R}{R+r}$$

the back-coupled voltage from the output voltage E of the output element I to the element II through the coupling impedance $r$ (the value of the impedance being taken as $r$) and the impedance of the element III is represented as: $e=K^2E$, when K is small ($r>>R$). Therefore, assuming that:

$$\frac{R}{R+r_n}=K^2$$

and, $$\frac{r}{r_n}=K$$

thus making $e_n=-e$, the input applied by the back-coupling voltage from the output element through the elements which are not excited can be completely neutralised by the voltage in counter-phase applied through the neutralising impedance $r_n$.

Figure 4:
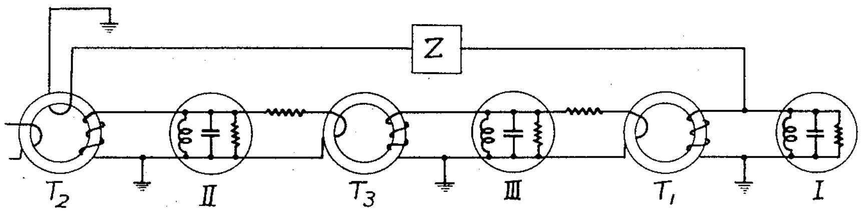
Figure 5:
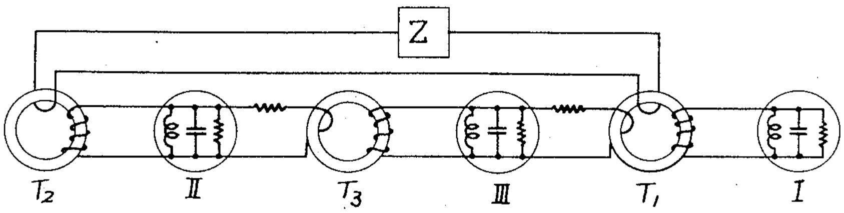

Figs. 4 and 5 show other examples of this invention, in which each element is coupled by a transformer. In Fig. 4, the output of the element I is coupled with the input transformer $T_2$ of the element II, and in Fig. 5, the input transformer $T_1$ of the element I and the input transformer $T_2$ of the element II are coupled through the neutralising impedance Z. The use of a transformer for stage coupling as in this case is advantageous for the matching of the impedance levels, the reversal of polarity, and inter-winding insulation. By making a neutralising coupling with the above transformer, the circuit can be greatly simplified. Also, by adjusting the winding ratio of the transformer, the impedance can be varied at will. Therefore, the neutralising impedance Z can be selected at will.

Figure 6:
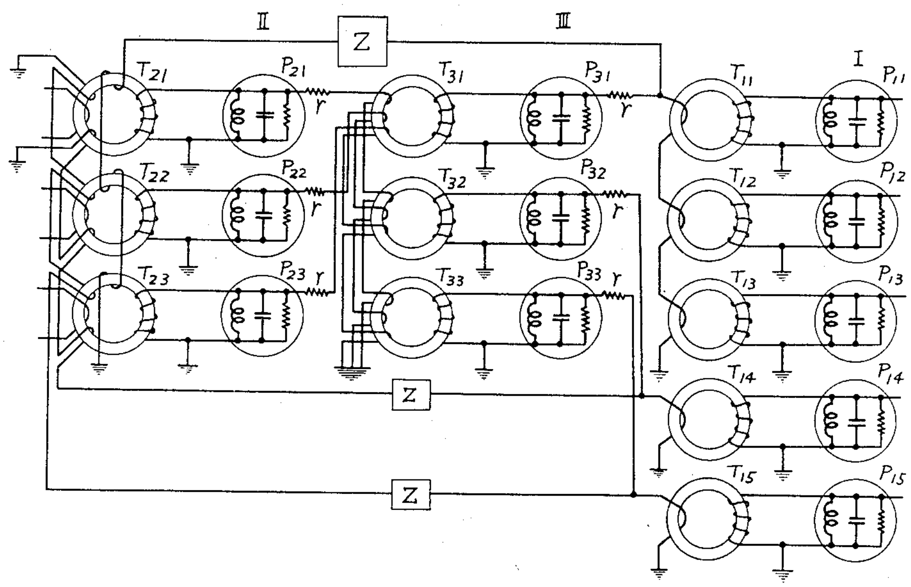

Fig. 6 is an example of the cases wherein the output voltage induced at the primary windings of the input transformer is utilised. To the elements $P_{21}$, $P_{22}$ and $P_{23}$ which belong to the group II, the outputs of the elements $P_{11}$, $P_{12}$ and $P_{13}$ are applied as a back-coupled voltage through the elements $P_{31}$, $P_{32}$ and $P_{33}$ of the group III. In order to neutralise the back-coupled voltages, the outputs of the above elements of group I are applied to the input transformer of the elements $P_{21}$, $P_{22}$ and $P_{23}$ through the neutralising impedance Z, by utilising the primary windings of the input transformers $T_{11}$, $T_{12}$, $T_{13}$, $T_{14}$ and $T_{15}$. In such a circuit connection, it is therefore possible to make a neutralising coupling without regard to the number of branches, coupling intensity, or polarity, from the element $P_{31}$ of group III to the elements of group I.

Although the neutralising couplings used to eliminate the back-coupling voltage shown in the above examples are different in impedance level, it is clear that the basic principle of operation is equivalent. When the resonance frequency of the element, which is not excited and which forms the route for the back-coupling voltage is somewhat different from the oscillation frequency, namely, in situations where each element is not made completely uniform, the above neutralising action becomes somewhat incomplete. Assuming that the inductance and electrostatic capacity forming the resonance circuit of the element are respectively L and C, and that the angular frequency of the oscillation of the parametrons is $\omega$, the impedance of the resonator $Z_p$ is represented as:

$$1/Z_p=1/R+j(\omega C-1/\omega L)$$

If the magnitude of detuning $a$ is small $Z_p$ con be represented as: $Z_p=R(1-jQa)$, $Q=\omega CR$, $a=(1-1/\omega^2LC)$, where Q is the magnification factor of the resonance circuit, and $a$ the magnitude of detuning. Hence, where the resistance coupling method is used, the back-coupling voltage caused by detuning is represented as: $e=K^2[(Qa)^2-jQa]E$. Even when there exists a slight magnitude of detuning $a$, the inphase component affects only $(Qa)^2$, and this can be neglected. Therefore, the main part of $e$ is $jQaK^2E$, having the phase different by 90°. Thus, a back-coupling voltage which is not neutralised due to detuning, takes a phase 90° from both the zero-phase and $\pi$-phase signals, namely a $\pm\pi/2$ phase. It is clear from the theory of parametrically excited resonators, that such out-of-phase voltages have zero sensitivity for controlling the oscillation phase of parametrons.

Therefore, even when each element is not made strictly uniform, undesirable effects can be eliminated satisfactorily, by the neutralisation of the back-coupling voltage, and an accurate operation can be achieved thereby. For example, when $$|Qa|<\frac{1}{5}$$

the back-coupling voltage may be diminished by about 20 db, and it is possible to increase the number of branches of output to 10 times as many.

Figure 7A:
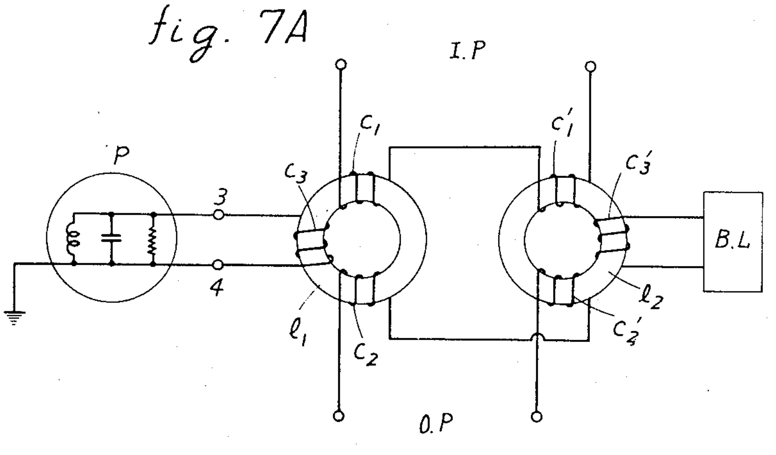
Figs. 7A and 7B show the unit circuit of another embodiment of the present invention.
Figures 7B, 7C, 8:
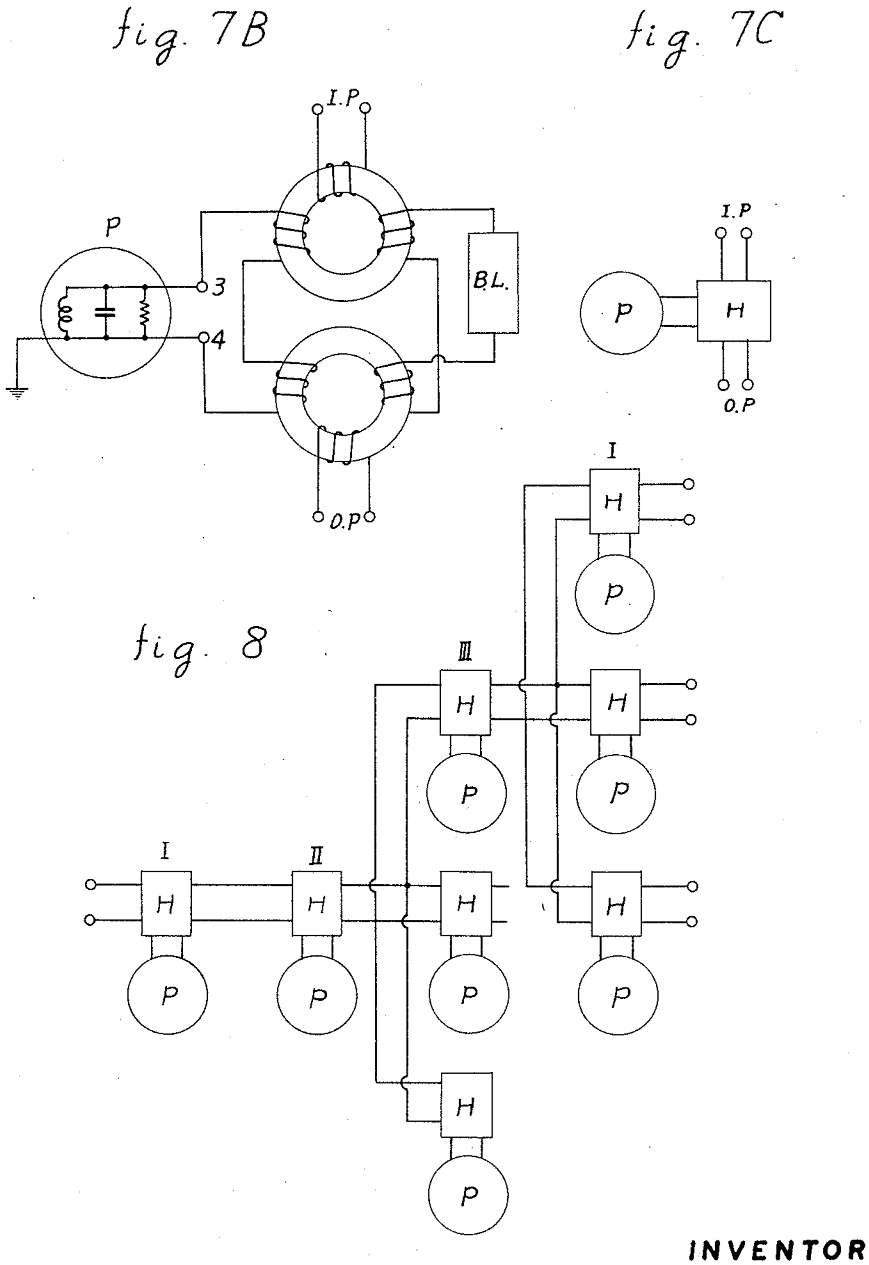
Fig. 7C shows the symbol of such a circuit used in the drawings.
Fig. 8 shows still another embodiment of the invention formed by the unit circuit shown in Fig. 7.

Fig. 7(A) shows an example of the unit circuit of another embodiment of this invention, in which an ordinary hybrid coil is used. $p$ is a parametron, and $1_1$ and $1_2$ are two magnetic cores of the same shape, of ferrite for example. On the magnetic cores $1_1$ and $1_2$, the primary windings $c_1$ and $c_1'$ and secondary windings $c_2$ and $c_2'$ are respectively wound. The windings $c_1$, $c_1'$ and the windings $c_2$, $c_2'$ are respectively connected in series, and $c_2$ and $c_2'$ are wound in opposite directions and the two ends of the primary windings are the input terminals IP, and those of the secondary windings are the output terminals OP. On the magnetic cores $1_1$ and $1_2$, the third windings $c_3$ and $c_3'$ are provided. At the two ends of $c_3$, the input and the two ends of output terminals 3 and 4 of the parametron are connected, and at $c_3'$, a balanced load BL having an impedance substantially equal to that of the parametron is connected, whereby the voltages induced in the secondary windings $c_2$ and $c_2'$ by the input of the primary windings are made equal. Then, when a control input wave having, for example, zero-phase is applied to the input terminal IP, the secondary voltages induced on the secondary windings $c_2$ and $c_2'$ cancel each other, and do not appear between the output terminals OP. However, the voltage induced on the third winding $c_3$ is applied effectively on the input ends 3 and 4 of the parametron, and therefore, the phase of the oscillation wave can be controlled. The oscillation output of the element $p$ is applied to the windings $c_3$, and the secondary voltage thereof is produced. Such voltage can be taken out of the terminals OP as output of the parametron, and can be applied to the elements of the succeeding stage. When the exciting wave is not applied to the element $p$, the voltages induced in the primary windings $c_1$ and $c_1'$ cancel each other, even when some alternating voltage is applied to the output terminals OP, and therefore, no secondary voltage is produced at the input terminals IP. The object of this example is to connect a hybrid circuit to the input and output terminals of a parametron, and to apply input or take out output through a hybrid circuit. Fig. 7B shows an example of such a hybrid circuit. Any other appropriate hybrid circuit can also be utilized.

The above unit circuit is represented, as in Fig. 7C, as the element $p$ and the hybrid circuit H, which has the input terminals IP and the output terminals OP. For example, in Fig. 8, each parametron $p$ is connected respectively to a hybrid circuit H, and the couplings between group I and II, between II and III, and between III and I are made through the said hybrid circuit H. Therefore, the output of the elements at the left end of group I is applied to the elements of group II by a proper coupling. However, since the output of each element at the right end of group I is applied to the output end of a hybrid circuit of the elements, not excited, of group III, the output of the elements at the right end is completely cut off by this hybrid circuit, and there is no fear that such an output is applied, as a control wave, to the elements of group II as a back-coupling voltage. Also, the output of each element can be utilised effectively without any loss, as a control wave for the succeeding stage, and, since the elements to be controlled are controlled precisely only by the output wave of the preceding stage, it is possible to control a great many elements with the output of one element.

In the devices, such as electric computers and electrical communication devices, a "not circuit," namely a circuit in which a zero-phase signal of a parametron is converted to a $\pi$-phase signal or vice versa and is applied to the succeeding element, is frequently used. In such cases, when a resistance coupling as in Fig. 2 is used, the conversion must be made by providing a transformer or the like for this purpose. However, when a hybrid circuit as above-mentioned is used, a "not circuit" can easily be made by simply reversing the interterminal connection of input or output. By doing so, the construction of the whole apparatus is simplified.

I claim:

1. In an electric digital computing device having a plurality of electric resonators, each of said resonators having at least one reactor, the reactance of which is made to vary at frequency $2f$, whereby oscillation of frequency $f$ is produced in each of said resonators, digital signals in said device being represented by the phase difference in said oscillation of said resonators at frequency $f$, said resonators being in a plurality of stages, and said oscillations being produced in said resonators successively in the same order as the order of said stages, the oscillation voltage of said resonators in each of said stages being transmitted to said resonators in the succeeding stage to said each stage, whereby the oscillation phase of said resonators in said succeeding stage is controlled when the oscillation in said succeeding stage is restarted after interruption, that improvement comprising a phased signal transmitting coupling means connected between the resonators in adjacent stages for transmitting the oscillation voltage of the resonators in one stage to the resonators in the next succeeding stage, and a voltage opposing coupling means provided between the resonators in one stage and the resonators in succeeding stages, for diminishing the back coupling voltage which is produced by said phased signal transmitting coupling means, and which is impressed on the resonators in said one stage from the resonators in the second succeeding stage through the resonators in the next succeeding stage when the resonators in the next succeeding stage are not excited.

2. The improvement as claimed in claim 1, in which said voltage opposing coupling means is an impedance for applying a voltage opposite in phase to said back-coupling voltage to said resonators in said one stage, whereby the back-coupling voltage is substantially cancelled.

3. The improvement as claimed in claim 1, in which said voltage opposing coupling means consists of an impedance and a matching transformer for applying a voltage opposite in phase to said back-coupling voltage to said resonators in said one stage, whereby the back-coupling voltage is substantially cancelled.

4. The improvement as claimed in claim 1, in which said phased signal transmitting coupling means comprises a coupling impedance and a matching transformer between resonators in adjacent stages.

5. The improvement as claimed in claim 1, in which said phased signal transmitting coupling means comprises an impedance and a matching transformer between resonators in adjacent stages, and said voltage opposing coupling means comprises a further impedance and said matching transformer for applying a voltage opposite in phase to said back-coupling voltage to said resonators in said one stage, whereby the back-coupling voltage is substantially cancelled and said matching transformer serves in both the phased signal transmitting coupling means and the voltage opposing coupling means.

6. The improvement as claimed in claim 1, in which said phased signal transmitting coupling means and said voltage opposing coupling means between each adjacent stage comprise a hybrid coil having a balancing load.

References Cited in the file of this patent

UNITED STATES PATENTS

| | | |
|---|---|---|
| 1,773,772 | Berthold | Aug. 26, 1930 |
| 1,792,001 | Craig | Feb. 10, 1931 |
| 2,652,501 | Wilson | Sept. 15, 1953 |
| 2,754,430 | Isborn | July 10, 1956 |
| 2,795,706 | Barker | June 11, 1957 |